(12) United States Patent
Chen et al.

(10) Patent No.: US 7,495,909 B1
(45) Date of Patent: Feb. 24, 2009

(54) MOUNTING DEVICE FOR DATA STORAGE DEVICE

(75) Inventors: Yun-Lung Chen, Taipei Hsien (TW); Da-Long Sun, Shenzhen (CN); Wan-Cheng Lin, Taipei Hsien (TW); Pei-Bin Luo, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/967,096

(22) Filed: Dec. 29, 2007

(30) Foreign Application Priority Data

Dec. 13, 2007 (CN) .......................... 2007 2 0201619

(51) Int. Cl.
*G06F 1/16* (2006.01)
*A47B 81/00* (2006.01)

(52) U.S. Cl. ..................................... 361/685; 312/223.1

(58) Field of Classification Search ......... 361/683–685, 361/724–727; 312/223.1, 223.2
See application file for complete search history.

(56) References Cited

U.S. PATENT DOCUMENTS

| | | | | |
|---|---|---|---|---|
| 6,297,952 B1 * | 10/2001 | Liu et al. | ..................... | 361/685 |
| 6,456,489 B1 * | 9/2002 | Davis et al. | .................. | 361/684 |
| 6,665,177 B2 * | 12/2003 | Chen | .......................... | 361/685 |
| 6,728,109 B1 * | 4/2004 | Wu | ............................. | 361/747 |
| 2006/0245158 A1 * | 11/2006 | Chen et al. | ................... | 361/685 |

\* cited by examiner

*Primary Examiner*—Jayprakash N Gandhi
*Assistant Examiner*—Nidhi Desai
(74) *Attorney, Agent, or Firm*—Frank R. Niranjan

(57) ABSTRACT

A mounting device for a data storage device has a retaining hole defined in a side surface thereof. The mounting device includes a bracket for receiving the data storage device, and a retaining member rotatably attached to the bracket. The bracket includes a sidewall and a bottom wall. A first elastic piece is formed on the sidewall. A positioning tab extends towards the side surface of the data storage device from a free end of the first elastic piece. The retaining member includes a first pressing portion. The first pressing portion presses the free end of the first elastic piece towards the data storage device. The positioning tab on the free end of the first elastic piece inserts into the retaining hole of the data storage device for mounting the data storage device.

12 Claims, 7 Drawing Sheets

MOUNTING DEVICE FOR DATA STORAGE DEVICE

BACKGROUND

1. Field of the Invention

The present invention relates to a mounting device, and more particularly to a mounting device for securely and simply retaining a data storage device in a computer enclosure.

2. Description of Related Art

Usually, at least one data storage device is secured in a computer for data storage use. The at least one data storage device is conventionally secured to the computer by a plurality of screws. The screws are small, and when securing or dismounting the data storage device the screws are easily dropped into the computer enclosure, which may result in damage.

Subsequently, some mounting devices for mounting the data storage device without screws are developed. A typical screwless disk drive mounting structure includes a casing. The casing having positioning units disposed in two opposite sidewalls thereof at different elevations, a plurality of carrier plates respectively hooked in the positioning units and adapted for holding disk drives in the casing at different elevations, a plurality of hold-down frames respectively pivoted to the positioning units at one sidewall of the casing and adapted for holding down the corresponding disk drives on the carrier plates, and a plurality of locking handles respectively pivoted to the positioning units at one sidewall of the casing and adapted for locking the hold-down frames and the disk drives. However, the above described-structure has two disadvantages. First, the mounting structure has many complicated components, and the mounting structure is difficult to manufacture. Second, a large space is needed for rotating out the locking handle of the mounting structure.

What is needed, therefore, is to provide a mounting device for data storage devices, having a simple structure, and is easy to use.

SUMMARY

A mounting device for a data storage device has a retaining hole defined in a side surface thereof. The mounting device includes a bracket for receiving the data storage device, and a retaining member rotatably attached to the bracket. The bracket includes a sidewall and a bottom wall. A first elastic piece is formed on the sidewall. A positioning tab extends towards the side surface of the data storage device from a free end of the first elastic piece. The retaining member includes a first pressing portion. The first pressing portion presses the free end of the first elastic piece towards the data storage device. The positioning tab on the free end of the first elastic piece inserts into the retaining hole of the data storage device for mounting the data storage device.

Other advantages and novel features of the present invention will become more apparent from the following detailed description of preferred embodiment when taken in conjunction with the accompanying drawings, in which:

DETAILED DESCRIPTION

Figure 1:
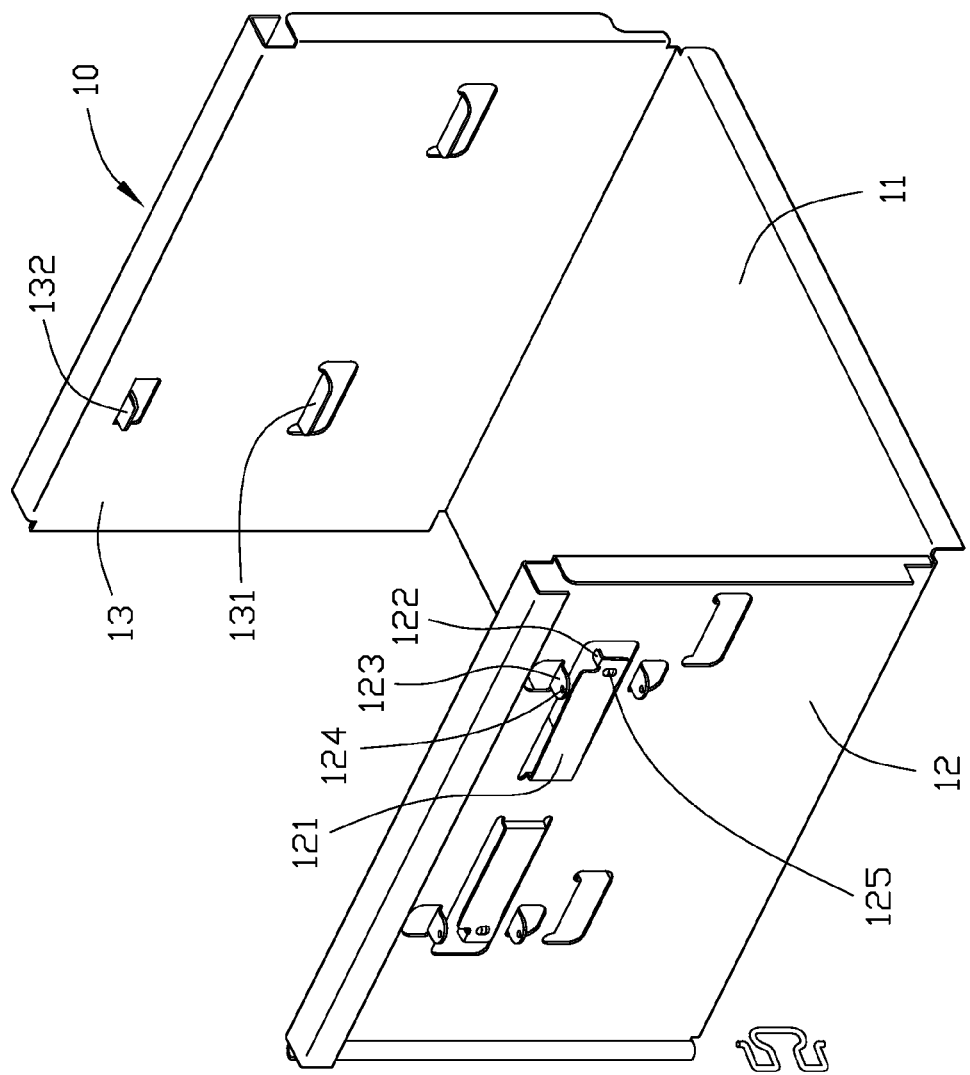
FIG. 1 is an exploded, isometric view of a mounting device for a data storage device according to a preferred embodiment of the present invention, the mounting device includes a bracket, and a retaining member.
Figure 1:
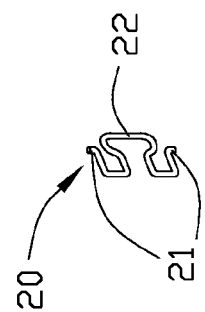

Referring to FIG. 1, a mounting device for a data storage device of a preferred embodiment of the present invention includes a bracket 10 for receiving the data storage device, and a retaining member 20 rotatably attached to the bracket 10.

The bracket 10 has a bottom wall 11 and two sidewalls 12, 13 perpendicularly extending up from opposite edges of the bottom wall 11 respectively. A pair of supporting portions 131 is inwardly formed at a middle portion of each of the sidewalls 12, 13. A positioning portion 132 is punched inwardly in the sidewall 13 above the supporting portions 131. A distance between the positioning portion 132 and the supporting portions 131 of the sidewall 13 equals a height of the data storage device adapted to be received in the bracket 10. The sidewall 12 is punched outwards to form a pair of elastic pieces 121 on an outer surface of the sidewall 12. Each elastic piece 121 has a root connected with the sidewall 12, and a free end movable in a direction perpendicular to the sidewall 12. A positioning tab 122 extends toward the sidewall 12 from the free end of each elastic piece 121. A positioning block 125 is formed on the free end of each elastic piece 121 adjacent the positioning tab 122. A pair of tongues 123 is formed outwardly on the sidewall 12 above and below the free end of each elastic piece 121 respectively. A pivot hole 124 is defined in each tongue 123. The positioning block 125 and two pivot holes 124 are not on a beeline.

The retaining member 20 is formed from an elastic wire and includes a pressing portion 22 and a pair of pivot portions 21 extending from opposite ends of the pressing portion 22 respectively.

Figure 2:
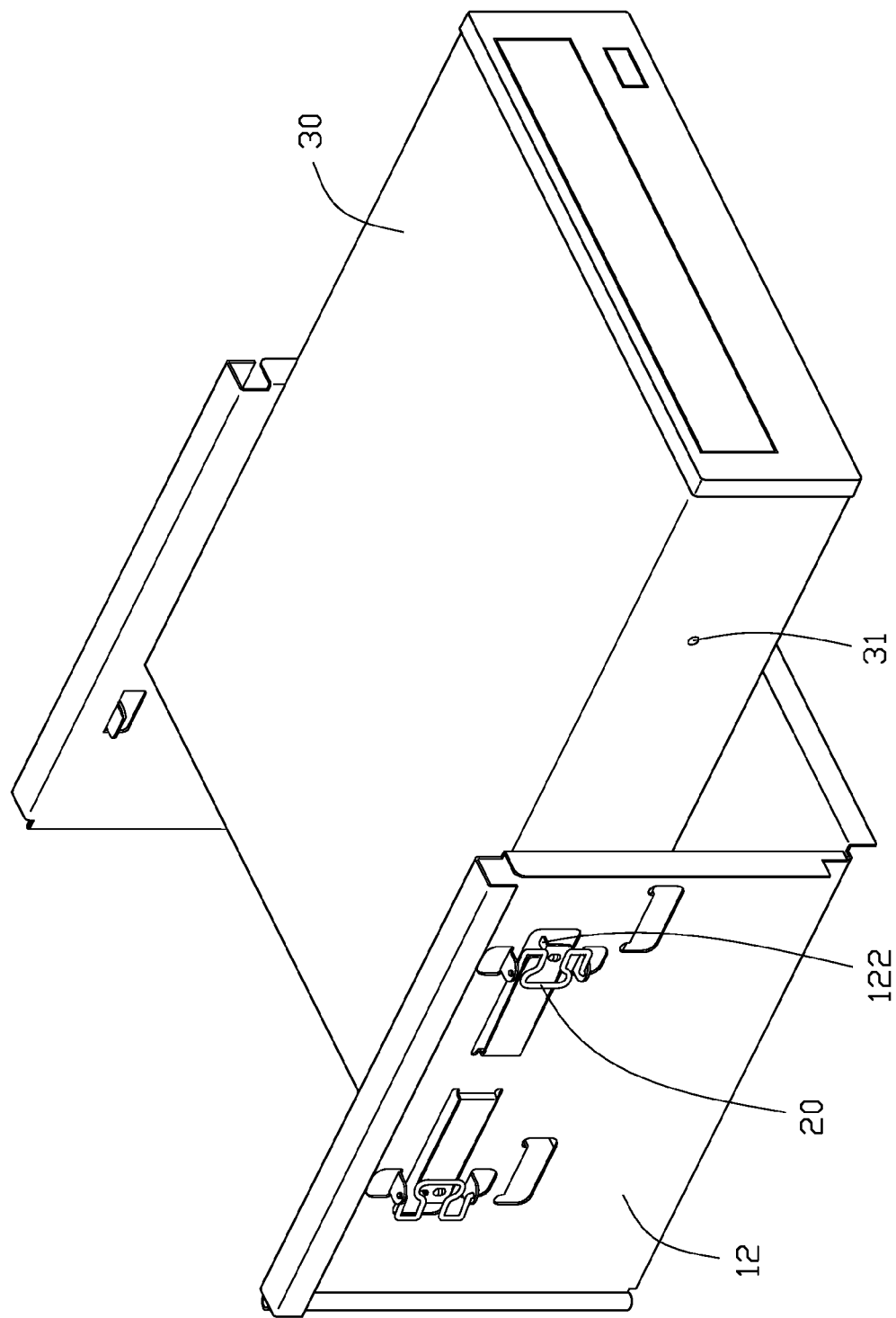
FIG. 2 is an assembled view of the mounting device of FIG. 1 and a data storage device.
Figure 3:
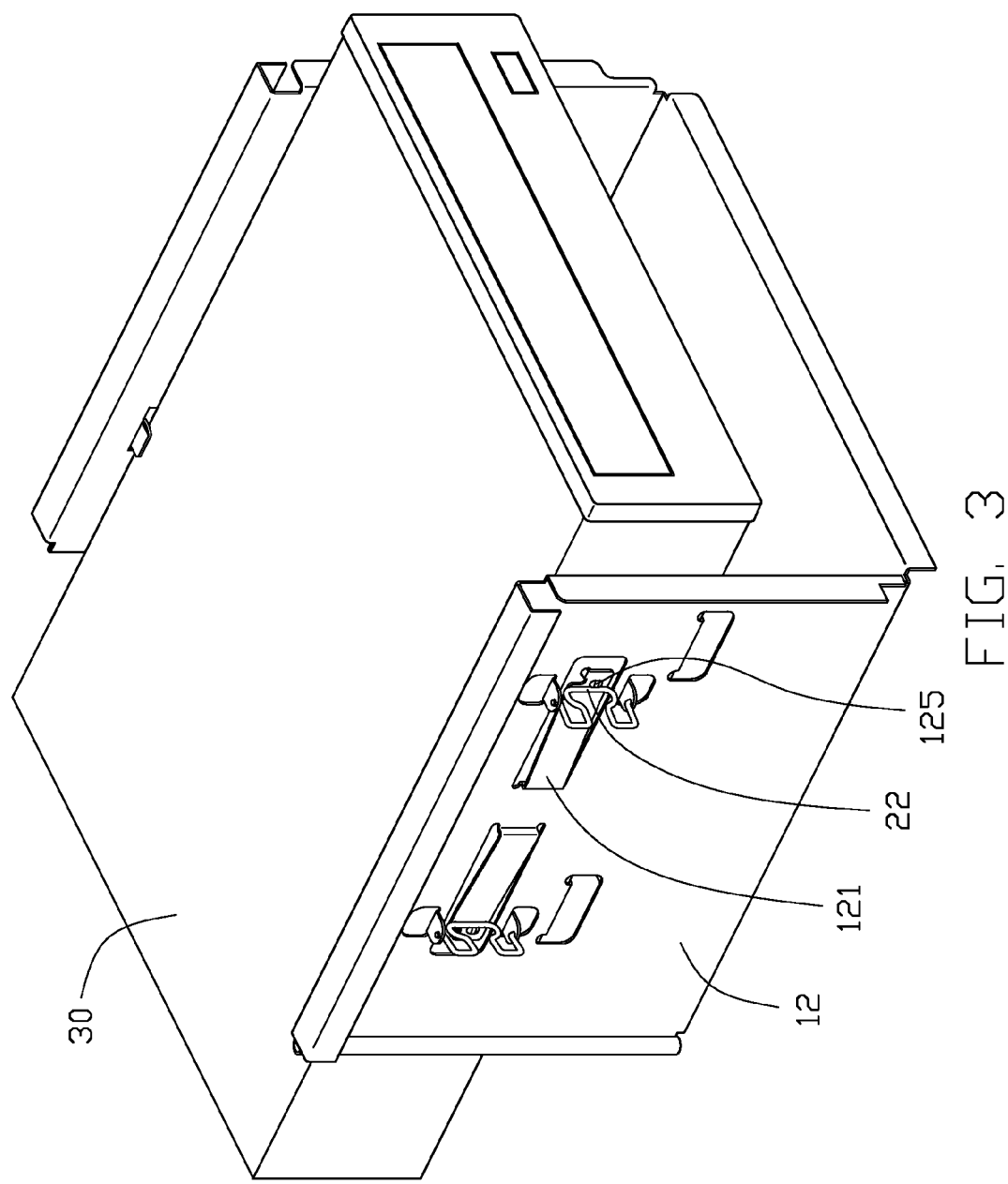
FIG. 3 is a mounted view of mounting the data storage device to the mounting device of FIG. 2.

Referring also to FIG. 2 and FIG. 3, in assembling of the mounting device of FIG. 1, the retaining member 20 is laid parallel the sidewall 12. Opposite sides of the retaining member 20 are pressed inward to have the pair of pivot portions 21 insert into the pivot holes 124 respectively, so the retaining member 20 is rotatably fixed on the sidewall 12. A data storage device 30 is pushed into the bracket 10 and slid along the supporting portion 131 of the bracket 10. A pair of retaining holes 31 is defined in a side surface of the data storage device 30, facing the sidewall 12 of the bracket 10. When the data storage device 30 is totally received in the bracket 10, the positioning tab 122 of each elastic piece 121 is aimed at the retaining hole 31. The retaining member 20 is then rotated and the pressing portion 22 urges the free end of the elastic piece 121 to move towards the data storage device 30, and the positioning tab 122 of the elastic piece 121 is inserted into the retaining hole 31 of the data storage device 30. Thus, the data storage device 30 is firmly secured in the bracket 10. The retaining member 20 rotates until the positioning block 125 blocks the pressing portion 22 of the retaining member 20 to prevent the retaining member 20 rotating further. At this blocked position, an acute angle is formed between the retaining member 20 and the elastic piece 121 for self-locking the retaining member 20 in the blocked positioning by a resilient force of the elastic piece 121.

In detaching of the data storage device 30, the retaining member 20 is rotated to release the elastic piece 121. The elastic piece 121 rebounds, and the positioning tab 122 of the elastic piece 121 disengages from the retaining hole 31 of the data storage device 30. The data storage device 30 can then be detached from the bracket 10.

Figure 4:
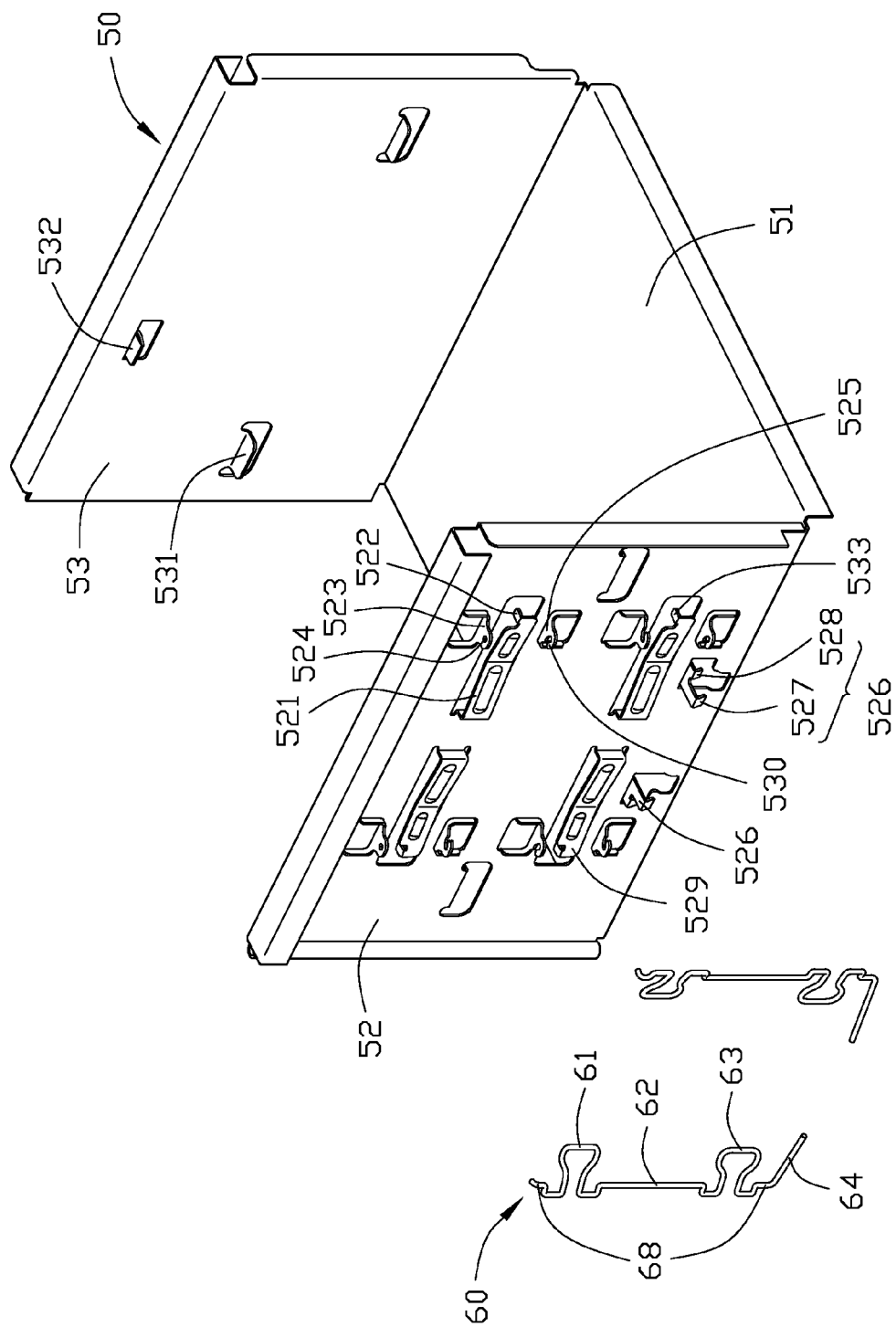
FIG. 4 is an exploded, isometric view of a mounting device for a data storage device according to another preferred embodiment of the present invention, the mounting device includes a bracket, and a retaining member.

Referring to FIG. 4, a mounting device for a data storage device of another preferred embodiment includes a bracket 50 for receiving data storage devices, and a pair of retaining members 60 rotatably attached to the bracket 50.

The bracket 50 has a bottom wall 51 and two sidewalls 52, 53 perpendicularly extending up from opposite edges of the bottom wall 51 respectively. A pair of supporting portions 531 is inwardly formed at a middle portion of each of the sidewalls 52, 53. A positioning portion 532 is inwardly punched on the sidewall 53 above the supporting portions 531. A distance between the positioning portion 532 and the supporting portions 531 of the sidewall 53 equals a height of a data storage device adapted to be received in the bracket 50. A pair of first elastic pieces 521 is formed above the supporting portions 531 of the sidewall 52, and a pair of second elastic pieces 529 is formed under the supporting portions 531. Two positioning tabs 522, 533 extend toward the sidewall 52 from a free end of each elastic piece 521, 529. A tongue 523 is formed outwardly on the sidewall 52 above the free end of each first elastic piece 521. A pivot hole 524 is defined in each tongue 523. A plurality of tongues 525 is formed outwardly on the sidewall 52 respectively under each first elastic piece 521 and adjacent the free end of each second elastic piece 529. A hook 530 is formed on each tongue 525. A pair of locking members 526 is formed on a lower portion of the sidewall 52. A far resisting arm 527 extends downwards from a far end of the locking member 526, and a near resisting arm 528 extends downwards from a near end of the locking member 526, which is nearer the sidewall 52 than the far end of the locking member 526.

The retaining member 60 is a long elastic wire, and includes a first pressing portion 61, a second pressing portion 63, a connecting portion 62 connected between the first pressing portion 61 and the second pressing portion 63, a pair of pivot portions 68 extending from ends of the first pressing portion 61 and the second pressing portion 63, and a handle 64 extending from the end of the pivot portion 68 adjacent to the second pressing portion 63. An angle, which is about 20 degrees, is defined between a plane of the first pressing portion 61 and a plane of the second pressing portion 63.

Figure 5:
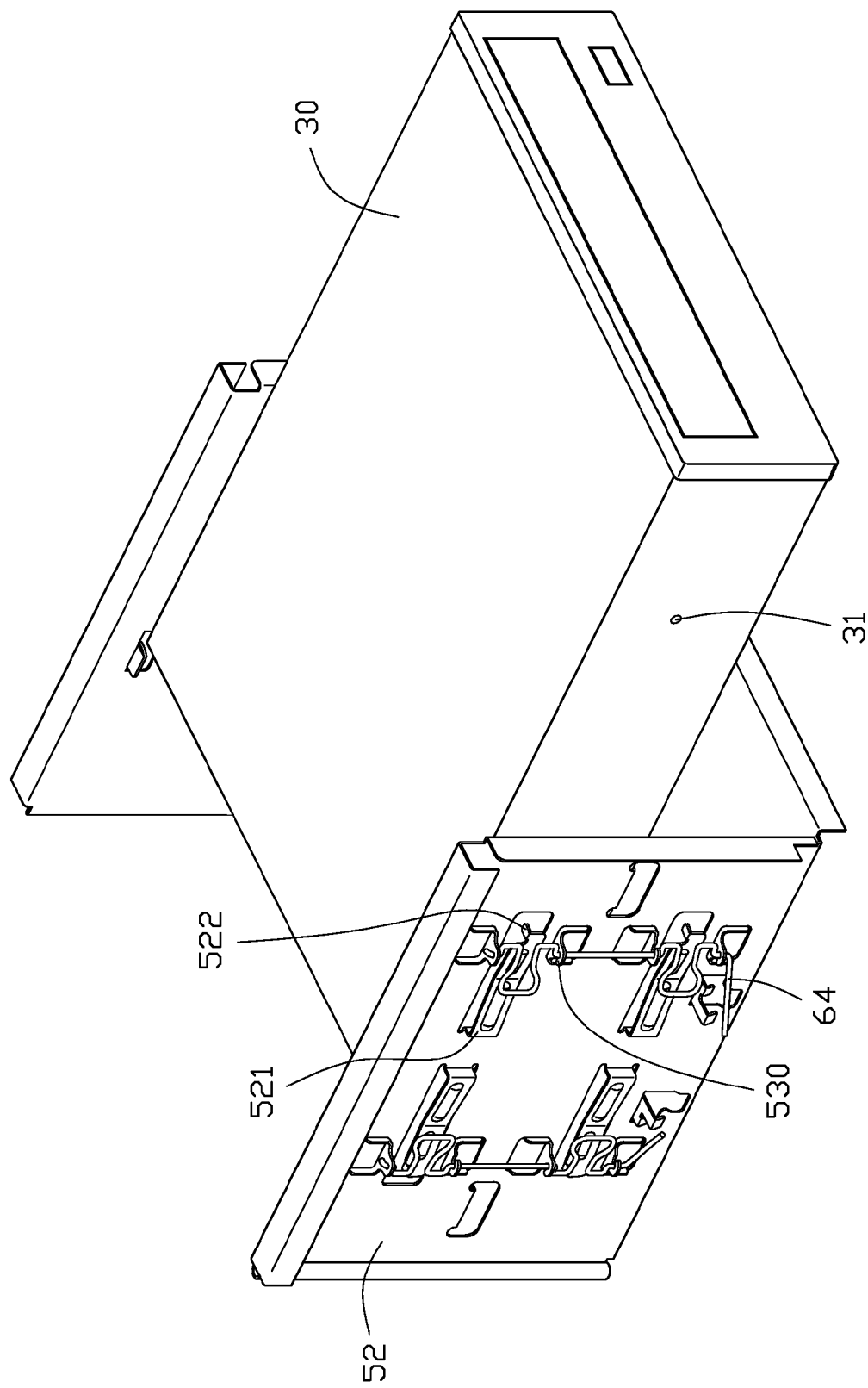
FIG. 5 is an assembled view of the mounting device of FIG. 4 and a data storage device.
Figure 6:
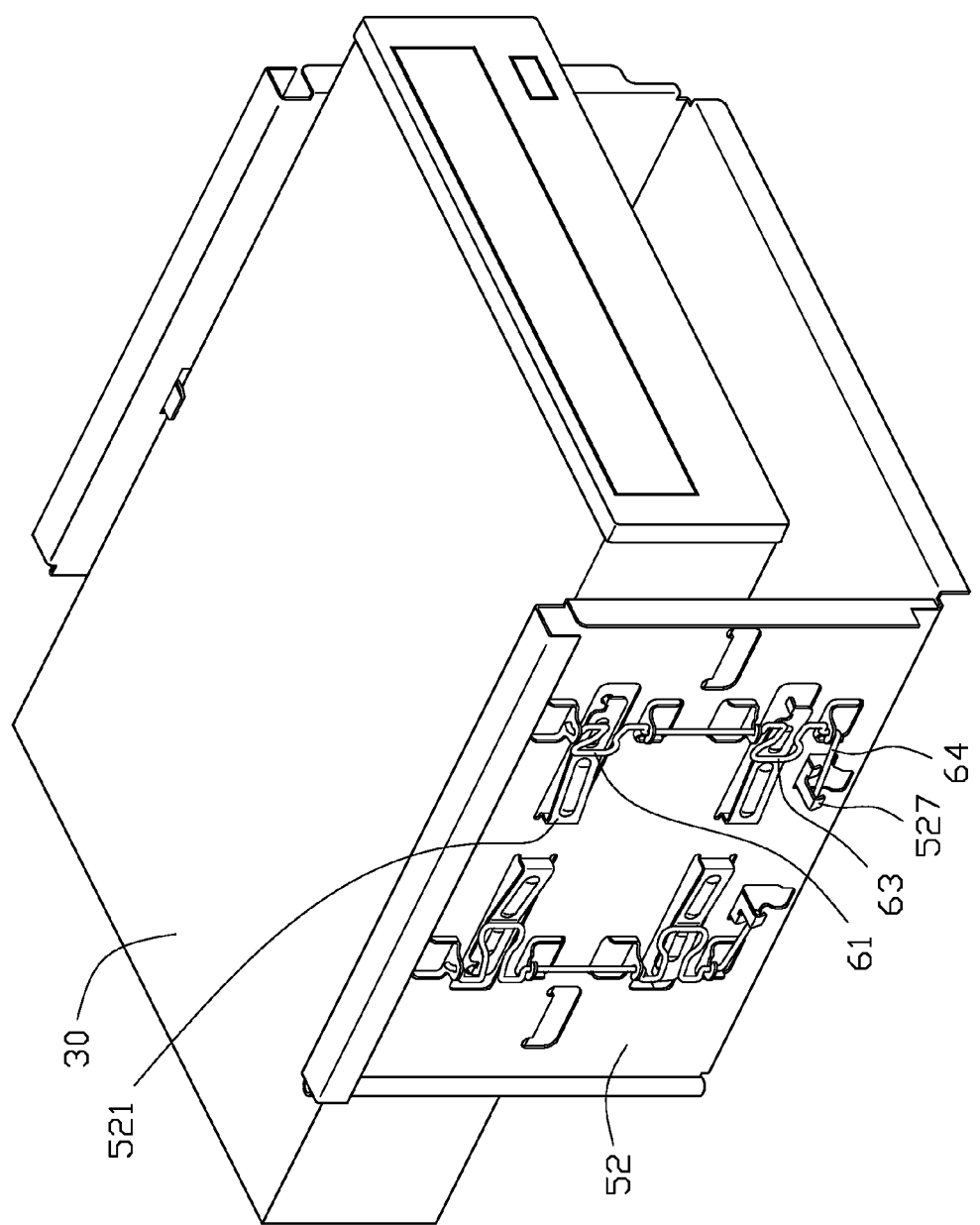
FIG. 6 is a view of mounting the data storage device in the mounting device of FIG. 5.
Figure 7:
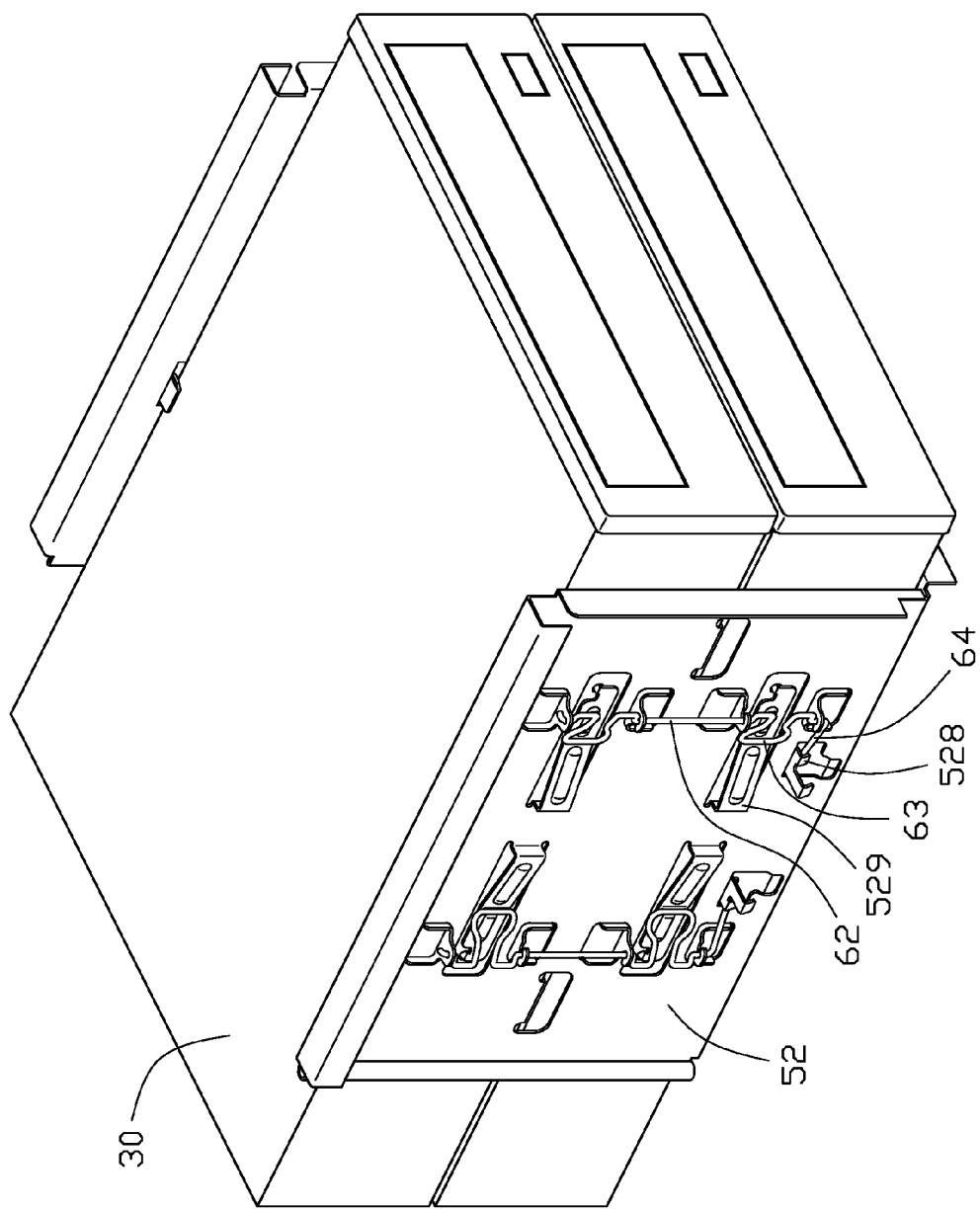
FIG. 7 is a view of mounting two data storage devices in the mounting device of FIG. 5.

Referring also to FIGS. 5, 6 and 7, in assembling of the mounting device of FIG. 4, the pivot portion 68 of the retaining member 60, which is connected to the first pressing portion 61, is pressed to insert it into the pivot hole 524 of the sidewall 52. The connecting portion 62 and the pivot portion 68 which is connected with the second pressing portion 63 are engaged with the hooks 530 of the sidewall 52 respectively, to rotatably mount the retaining member 60 on the sidewall 52. At this time, the first elastic piece 521 is at a released position. A data storage device 30 then slides on the supporting portions 531 of the bracket 50 until the positioning tab 522 of the first elastic piece 521 is aimed at the retaining hole 31 of the data storage device 30. The handle 64 is pulled to rotate the connecting portion 62 until the handle 64 is engaged with the far resisting arm 527 of the resisting arm 526 to place the retaining member 60 in a first position. The first pressing portion 61 of the retaining member 60 resists against the first elastic piece 521 of the sidewall 52. The positioning tab 522 is inserted into the retaining hole 31 to fix the data storage device 30 in the bracket 50. Then, because an angle exists between the first pressing portion 61 and the second pressing portion 63, the second pressing portion 63 cannot resist against the second elastic piece 529. Thus, the retaining member 60 is positioned in a first position. Another data storage device 30 is located on the bottom wall 51 and pushed in the bracket 50. When the positioning tab 533 of the second elastic piece 529 is aimed at the retaining hole 31 of the data storage device 30, the handle 64 is pulled further to engage with the near resisting arm 528 of the resisting arm 526 to place the retaining member 60 in a second position. The connecting portion 62 of the retaining member 60 is elastically contorted, and the second pressing portion 63 resists against the second elastic piece 529. The positioning tab 533 is inserted into the retaining hole 31. Another data storage device 30 is thus fixed in the bracket 50.

When disassembling the mounting device, the handle 64 is engaged with the far resisting arm 527, releasing the second pressing portion 63. The second elastic piece 529 rebounds to disengage the positioning tab 533 from the retaining hole 31 of the corresponding data storage device 30. The data storage device 30 is released from the bracket 50. When the handle 64 is moved away from the far resisting arm 527, the first pressing portion 61 is released. The first elastic piece 521 rebounds and the positioning tab 522 of the first elastic piece 521 disengages from the retaining hole 31 of the corresponding data storage device 30. The data storage device 30 can then be easily removed from the bracket 50.

In the mounting device for a data storage device of another preferred embodiment, a positioning block can also be formed on each elastic piece for blocking the pressing portion. An acute angle can also be defined between the retaining member and the elastic piece for self-locking the retaining member by a resilient force of the elastic piece.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting device for mounting a data storage device, the data storage device having a retaining hole defined in a side surface thereof, the mounting device comprising:

a bracket for receiving the data storage device, the bracket comprising a sidewall configured for abutting on the side surface of the data storage device, a first elastic piece formed on the sidewall, and a positioning tab extending toward the side surface of the data storage device from a free end of the first elastic piece; and a retaining member rotatably attached to the bracket, the retaining member comprising a first pressing portion, the retaining member being rotatable to a retaining position where the first pressing portion presses the free end of the first elastic piece to move towards the data storage device, thereby the positioning tab on the free end of the first elastic piece being inserted into the retaining hole of the data storage device to mount the data storage device;

wherein a second elastic piece is formed on the sidewall with a positioning tab formed on a free end of the second elastic piece for securing another data storage device, the retaining member comprises a second pressing portion to press the second elastic piece to have the positioning tab of the second elastic piece to be inserted in a retaining hole of the another data storage device;

wherein the first pressing portion and the second pressing portion are distinctly oriented, the retaining member being rotatable on the sidewall of the bracket and positioned in a first position where the first pressing portion resists the first elastic piece and the second pressing portion does not resist the second elastic piece, and a second position where the second pressing portion resists the second elastic piece.

2. The mounting device as described in claim 1, wherein a positioning block is formed on the free end of the first elastic piece for engaging with the first pressing portion.

3. The mounting device as described in claim 2, wherein an acute angle is formed between the first pressing portion of the retaining member and the first elastic piece.

4. The mounting device as described in claim 1, wherein the retaining member comprises a pair of pivot portions extending from opposite ends of the pressing portion, and a pair of pivot holes are formed on the sidewall receiving the pivot portions.

5. The mounting device as described in claim 1, wherein a locking member is formed on the sidewall, the locking member comprising a far resisting arm extending downwards from a far end of the locking member, and a near resisting arm extending downwards from a near end of the locking member, a handle extending outwards from a free end of the retaining member, the handle engaging with the far resisting arm when the retaining member is positioned in the first position, the handle engaging with the near resisting arm when the retaining member is positioned in the second position.

6. The mounting device as described in claim 1, wherein a connecting portion is connected between the first pressing portion and the second pressing portion, the connecting portion elastically contorted when the retaining member is positioned in the second position.

7. A mounting device assembly:

a bracket comprising a sidewall, a first elastic piece being formed on the sidewall, a positioning tab extending from a free end of the first elastic piece, the first elastic piece being bendable relative to the sidewall so as to move the positioning tab inwardly, a positioning block formed on the first elastic piece adjacent the positioning tab;

a retaining member pivotably attached to the bracket, the retaining member comprising a first pressing portion, and a pair of pivot portions extending from opposite ends of the first pressing portion pivotably mounting the retaining member to the bracket; and a data storage device located in the bracket and having a retaining hole defined in one side thereof, the pivot portions of the retaining member being configured for rotating relative to the sidewall in a manner such that the first pressing portion of the retaining member presses the first elastic piece to bend inwardly, whereupon the positioning tab of the first elastic piece is inserted into the retaining hole of the data storage device, and the positioning block of the first elastic piece is engaged with the first pressing portion;

wherein a second elastic piece is formed on the sidewall with a positioning tab formed on a free end of the second elastic piece for securing another data storage device, the retaining member comprises a second pressing portion to press the second elastic piece to have the positioning tab of the second elastic piece inserted in a retaining hole of the another data storage device.

8. The mounting device as described in claim 7, wherein the first pressing portion and the second pressing portion are distinctly oriented, the retaining member being rotatable on the sidewall of the bracket and positioned in a first position wherein the first pressing portion resists the first elastic piece and the second pressing portion does not resist the second elastic piece, and a second position where the second pressing portion resists the second elastic piece.

9. The mounting device as described in claim 8, wherein a locking member is formed on the sidewall, the locking member comprising a far resisting arm extending downwards from a far end of the locking member, and a near resisting arm extending downwards from a near end of the locking member, a handle extending outwards from a free end of the retaining member, the handle engaging with the far resisting arm when the retaining member is positioned in the first position, the handle engaging with the near resisting arm when the retaining member is positioned in the second position.

10. The mounting device as described in claim 8, wherein a connecting portion is connected between the first pressing portion and the second pressing portion, the connecting portion elastically contorted when the retaining member is positioned in the second position.

11. The mounting device as described in claim 7, wherein a positioning block is formed on the free end of the first elastic piece for engaging with the first pressing portion.

12. The mounting device as described in claim 11, wherein an acute angle is formed between the first pressing portion of the retaining member and the first elastic piece.

\* \* \* \* \*